(12) United States Patent
Amerige

(10) Patent No.: US 6,275,587 B1
(45) Date of Patent: Aug. 14, 2001

(54) SECURE DATA ENCODER AND DECODER

(75) Inventor: Stephen Kelley Amerige, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/108,090

(22) Filed: Jun. 30, 1998

(51) Int. Cl.$^7$ ........................................ H04N 7/16
(52) U.S. Cl. ............................. 380/255; 380/29; 380/28
(58) Field of Search .................. 380/28, 36, 37, 380/255

(56) References Cited

U.S. PATENT DOCUMENTS

| | | | |
|---|---|---|---|
| Re. 30,957 | | 6/1982 | Feistel ............................. 178/22.17 |
| 3,798,360 | * | 3/1974 | Feistel ................................. 178/22 |
| 4,202,051 | | 5/1980 | Davida et al. ........................... 375/2 |
| 4,316,055 | * | 2/1982 | Feistel ............................. 178/22.06 |
| 4,405,942 | * | 9/1983 | Block et al. ........................... 358/119 |
| 5,535,275 | * | 7/1996 | Dugisaki et al. ....................... 380/10 |
| 5,604,805 | * | 2/1997 | Brands ................................... 380/30 |

FOREIGN PATENT DOCUMENTS

| | | | |
|---|---|---|---|
| 43 41 045 | 6/1995 | (DE) | .............................. H04L/9/34 |
| 0 924 893 | 6/1999 | (EP) | .............................. H04L/9/00 |
| 10-049048 | 2/1998 | (JP) | .............................. G09C/1/00 |

OTHER PUBLICATIONS

International Preliminary Examination Report, Oct. 5, 2000.

"Codes, Ciphers and Secret Writing", M. Gardner, Dover Publications, Inc., NY, pp. 62–63.

"Applied Cryptography, Second Edition", Protocols, Algorithms, and Source Code in C, B. Schneier.

"The Art of Computer Programming", Third Edition, vol. 2, Seminumerical Algorithms, pp. 10, 11, 20, 21, 29, 35, 36,.

"Advanced Military Cryptography", W.F. Friedman, pp. 24–27, 30.

"Chaffing and Winnowing: Confidentiality without Encryption", R.L. Rivest, MIT Lab for Computer Science, pp. 1–8.

"Analysis and Design of Stream Ciphers", R.A. Rueppel, Dept. of Electrical Engineering and Computer Science, 1986, pp. 1, 3, 4, 6, 7, 8, 9, 14, 15, 16, 24.

\* cited by examiner

Primary Examiner—Thomas R. Peeso
Assistant Examiner—Todd Jack
(74) Attorney, Agent, or Firm—Fish & Richardson P.C.

(57) ABSTRACT

A computer system includes a processor and a computer readable medium storing a computer program product for encoding a serial bit stream of digital data. The product includes instructions for causing the processor to place a first number of bits from the input bit stream into bit positions of an encoded output unit in accordance with a first value, the first number of bits aligned to a bit position in the encoded output unit in accordance with a second value and insert bits of arbitrary value into remaining, bit positions of the unit of the encoded output unit. In addition, the computer program product includes instructions that cause a processor to select significant bits from a unit of the encoded bit stream in accordance with the first value and the second value to place the selected bits in a decoded bit stream.

54 Claims, 10 Drawing Sheets

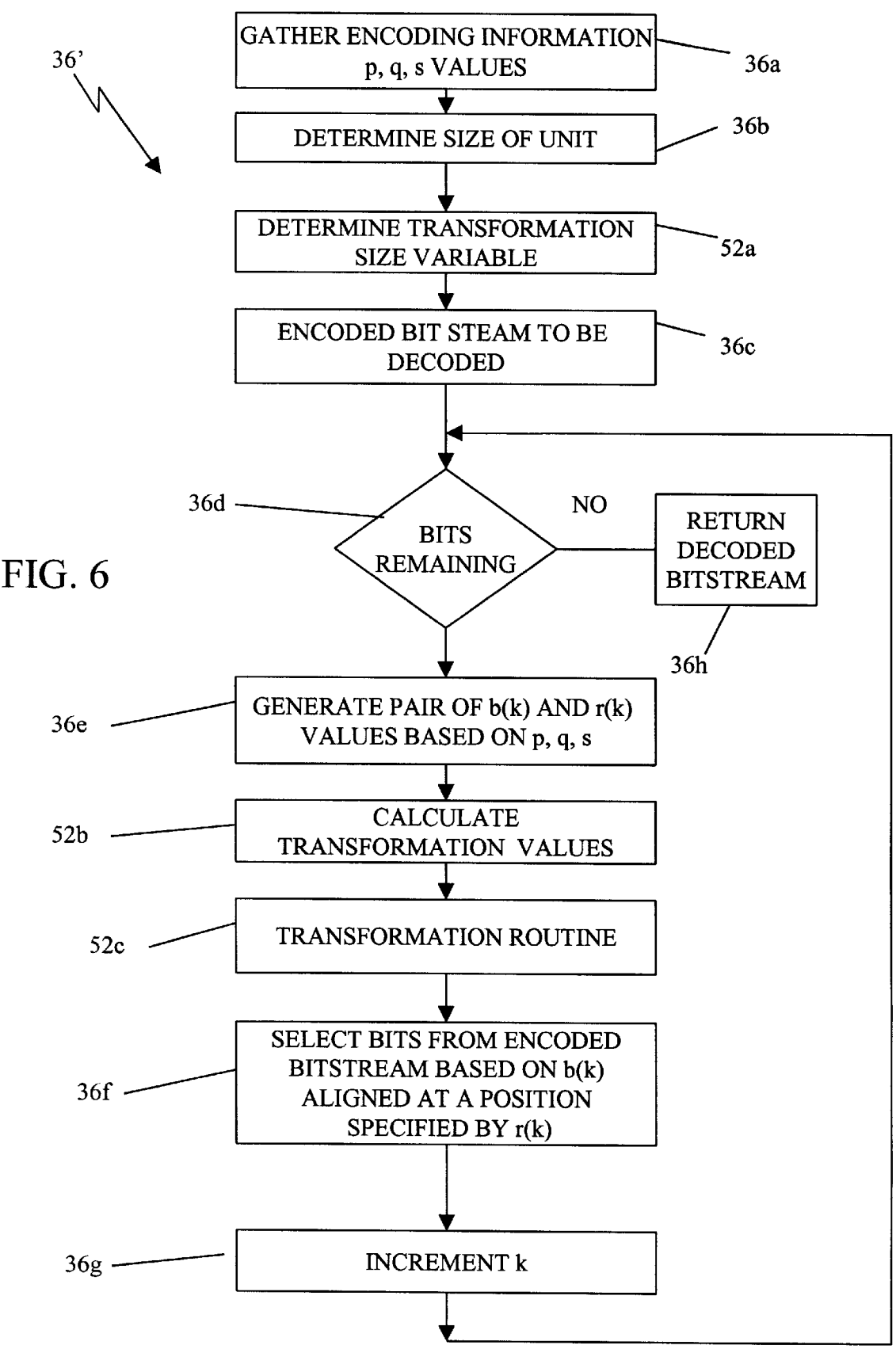

SECURE DATA ENCODER AND DECODER

BACKGROUND

This invention relates to secure communication techniques.

It is often desirable to transmit digital data from a source to one or more intended recipients in such a manner that the digital data can be recognized only by its intended recipients. Examples of instances where this is desirable include transmission of sensitive data (e.g., financial data, technical data, policy data) or software such as downloading an application program from the Internet, or retrieving a program or other data from a disk (e.g., optical or magnetic).

There are known techniques for secure data communication. Most of these techniques are classified as encryption/decryption techniques. In general, encryption techniques convert from one system of data formats to another sometimes by use of the source data to vary the conversion process. This conversion is performed in such a manner that given encryption information reconversion into the original form is possible by decryption.

A cryptographic transformation function takes data, e.g., symbols comprising a message in its original form, known as plaintext or plaintext symbols, and performs mathematical manipulations on the numerical representation of the message (either on a block or stream basis), transforming the message into ciphertext or cipertext symbols. Ciphertext is a representation of the original message which is unreadable, typically appearing as garbled text. Three types of cryptographic transformation functions which are used to convert plaintext to ciphertext are: secret key functions, public key functions, and hash functions.

Secret key functions employ directional encryption algorithms. A user selects a secret key which, along with the message to be encrypted, are the inputs to an algorithm. The resulting ciphertext is sent to a recipient where the recipient may be a person or a computer. To read the encrypted message, the recipient must know the user's secret key. Using the user's secret key and the ciphertext, as inputs to the same algorithm used to encrypt the message, the recipient is able to decrypt the message into plaintext and thus read the message sent by the user.

Encryption may also be accomplished by using a public key function. A public key function requires two keys, a public key and a private key for each user of the system. The public key for an individual user may be known by all other users of the system. The private key for the individual user should be known only by the individual user.

Hash functions unlike secret or public key are one-way encryption functions.

In the stream cipher technique, the symbols of the plaintext message are serially flowed through a stream ciphering system. The stream cipher system typically operates on the plaintext symbols using a key or random data to form a modulo sum.

SUMMARY

According to an aspect of the invention, a method includes encoding a serial bit stream of digital data by inserting bits of arbitrary value into bit positions of an encoded output unit along with a first number of bits from the serial bit stream. The method can also include decoding an encoded serial bit stream by selecting significant bits from a unit of the encoded bit stream that includes bits of arbitrary value.

According to a further aspect of the invention, a computer storage medium stores an encoded bit stream of digital data. The encoded bit stream include a header portion including encoding values used by a decoder to decode the encoded serial bit stream, a first set of portions of the encoded bit stream including bits of arbitrary value; and a second set of portions of the encoded bit stream including bits representative of an original input data stream.

According to a still further aspect of the invention, a method of encoding a serial bit stream of digital data, includes placing a first number of bits from the input bit stream into bit positions of an encoded output unit in accordance with a first value, said first number of bits aligned to a bit position in the encoded output unit in accordance with a second value and inserting bits of arbitrary value into remaining bit positions of the unit of the encoded output unit.

The bits of arbitrary value can be noise bits or bits from a second data stream. The bits can also be bits from a tail end of the serial bit data stream. The method iteratively generating a subsequent first value and subsequent second value for each action of placing a subsequent number of bits from the input bit stream into a subsequent encoded output unit. Generating the first value and the second value uses a deterministic non-trivial algorithm to select the first value and second value. The deterministic non-trivial algorithm can include determining pairs of generated values from a first prime number and a second prime number, where the first prime number is a primitive root of the second prime number.

According to a still further aspect of the invention, a method of decoding an encoded serial bit stream includes selecting significant bits from a unit of the encoded bit stream in accordance with a number of bits value and a bit alignment value to place the selected bits in a decoded bit stream.

The method gathers values of two prime numbers to produce generated values and generates the generated values based on the gathered values of the two prime numbers. The method produces the number of bits value and the bit alignment value from the generated values. The method iteratively generates values, produces the bit and alignment values and selects bits from the encoded bit stream until all bits of the encoded bit stream have been placed in the decoded bit stream.

According to a still further aspect of the invention, a computer program product resides on a computer readable medium. The product encodes a serial bit stream of digital data and includes instructions for causing a processor to place a first number of bits from the input bit stream into bit positions of an encoded output unit in accordance with a first value. The first number of bits are aligned to a bit position in the encoded output unit in accordance with a second value. The product also includes instructions to cause a computer to insert bits of arbitrary value into remaining, bit positions of the unit of the encoded output unit.

According to a still further aspect of the invention, a computer program product resides on a computer readable medium. The product can decode an encoded serial bit stream and includes instructions that cause a processor to select significant bits from a unit of the encoded bit stream in accordance with a number of bits value and a bit alignment value to place the selected bits in a decoded bit stream.

According to a still further aspect of the invention, a computer system includes a processor and a computer readable medium storing a computer program product for encoding a serial bit stream of digital data. The product includes instructions for causing the processor to place a first number of bits from the input bit stream into bit positions of an encoded output unit in accordance with a first value, said first number of bits aligned to a bit position in the encoded output unit in accordance with a second value and insert bits of arbitrary value into remaining, bit positions of the unit of the encoded output unit.

According to a still further aspect of the invention, a computer system includes a processor and a computer readable medium storing a computer program product for decoding an encoded serial bit stream. The computer program product includes instructions that cause a processor to select significant bits from a unit of the encoded bit stream in accordance with a number of bits value and a bit alignment value to place the selected bits in a decoded bit stream.

One or more of the following advantages may be provided by one or more of the aspects of the invention. The encoded bit stream has the original data inserted into random positions in the encoded output unit to obfuscate the original bits from the input bit stream. The encoded bit stream can have the input bit stream intermingled with useless data, e.g., random data or noise. Alternatively, the encoded bit stream can have the input data stream intermingled with useful data. The encoded output can be transformed by a transformation function or filter to further obfuscate the input stream. The output unit can have various sizes. Moreover, the output unit size can be fixed or variable.

BRIEF DESCRIPTION OF THE DRAWING

FIG. 6 is a block diagram of an alternate decoder.

DETAILED DESCRIPTION

Figure 1:
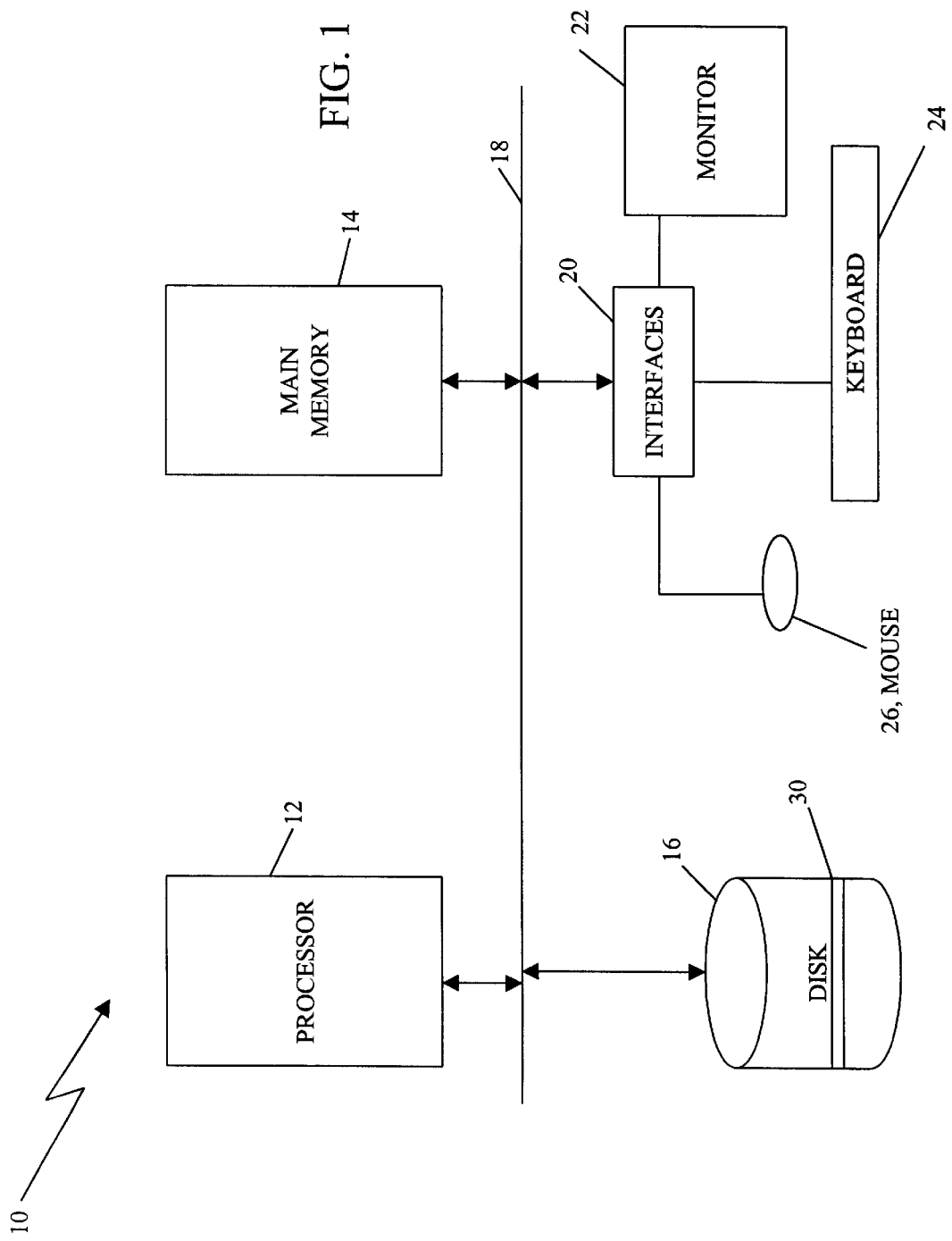
FIG. 1 is a block diagram of a computer system that encodes and decodes digital data.

Referring now to FIG. 1, a computer system 10 includes a processor 12, main memory 14, and disk drive or other type of persistence storage device 16 interconnected via a system bus 18. The system bus 18 is also connected to interfaces 20 that couple input/output devices such as a monitor 22, keyboard 24 and mouse 26 to the system 10. Residing on the disk or other type of persistence storage device 16 is a program 30 that encodes and decodes a serial stream of binary data. Alternatively, the system could be an digital controlled system, a device controller using an embedded controller, a server, and so forth.

Figure 2:
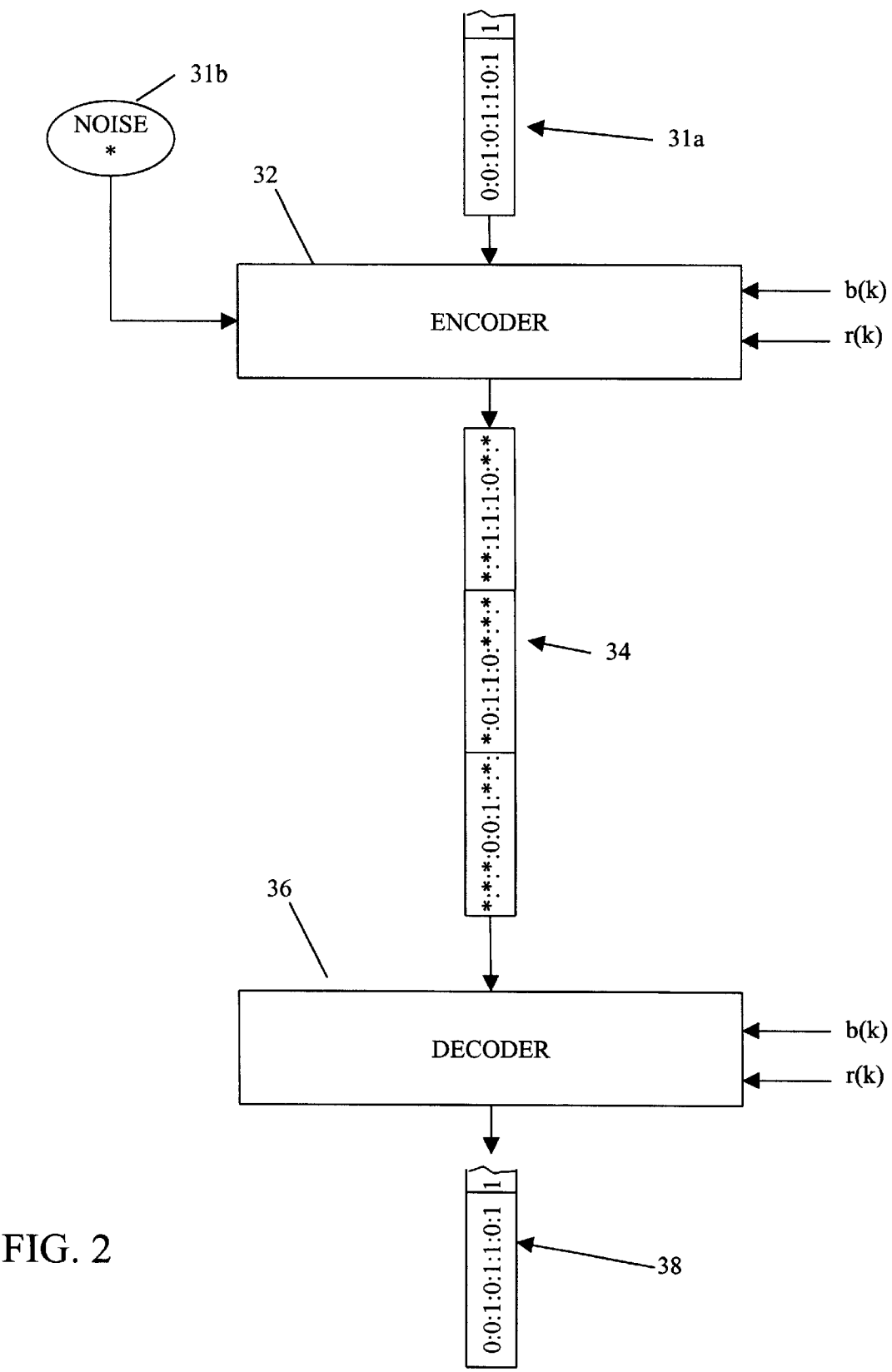
FIG. 2 is a block diagram of the encoder/decoder used in FIG. 1.
Figure 2A:
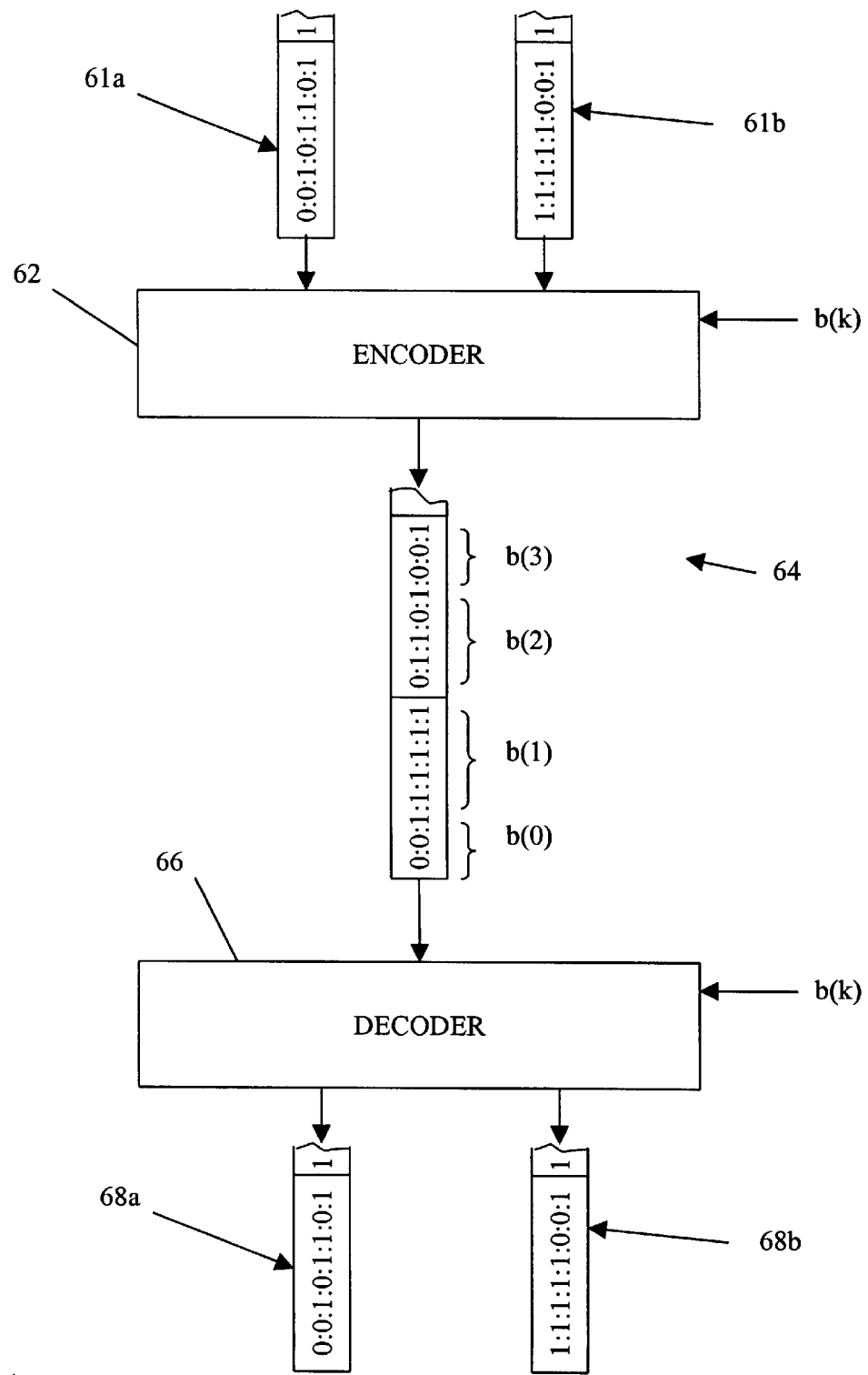
FIG. 2A is a block diagram of an alternate encoder/decoder.

Referring now to FIG. 2, the program 30 includes an encoder 32 that receives an input bit stream 31a and noise or random bits 31b and produces an encoded bit stream 34. The encoder 32 places a certain number of bits from the input bit stream into selected bit positions of an encoded output unit. More specifically, the encoder 32 places bits determined by a first value, e.g., b(k) from the input bit stream 31a into bit positions of the encoded output unit aligned to a bit position determined by a second value, e.g., r(k). The remaining bit positions in the output unit are filled with noise or bits of arbitrary value. Therefore, the encoded bit stream 34 contains the same binary data as the input bit stream with this binary data from the input bit stream intermingled with useless data, e.g., random data from a random number generator or noise 31b. FIG. 2A below describes a technique that intermingles an input data stream with useful data.

Optionally, the encoded output unit is transformed by a transformation function or filter to add additional security. The encoded bit stream 34 has the original data inserted into random positions in the encoded output unit. Therefore, the encodere 32 obfuscates the original bits from the input bit stream.

Typically, the output unit of the output bit stream comprises a byte or 8 bits of data. However, the output unit can have various sizes. For example, the output unit could be a word of 16 bits of data, a long word of 32 bits of data, or a quad word of 64 bits of data. In addition, the output unit size does not have to equal the unit size of the input data stream. Moreover, the output unit size can be fixed or variable, as will be described below. In addition, the entire output bit stream can be a single output unit.

The encoded bit stream 34 can be saved on the disk or other persistent storage 16 or transmitted over a network to another computer system (not shown). At some point, the encoded bit stream 34' is fed to a decoder 36. The decoder 36 uses the same encoding values, e.g., b(k), r(k) to decode the encoded bit stream and provide a decoded bit stream 38 corresponding to the original input bit stream 31a. The decoder 36 receives the encoded serial bit stream and selects meaningful bits from the units of the encoded bit stream 38, as determined by the number of bits value and the bit alignment value. The decoder 36 places the selected bits in the decoded bit stream 38.

Referring now to FIG. 2A, the program 30 alternatively can include an encoder 62 that receives a pair of input bit streams 61a, 61b and produces an encoded bit stream 64 which is comprised of interleaved portions or bits of each one of the input bit streams 61a, 61b. The encoder 62 can place a certain number of bits from the first input bit stream 61a into selected bit positions of an encoded output unit based on first values, e.g., b(0), b(2), and place a second number of bits from the second input bit stream 61b based on second values, e.g., b(1), b(3). In this manner, the encoder 62 can produce an encoded output stream 64 comprised of interleaved portions of two input data streams, thus making the entire encoded output stream 64 comprised of substantially useful information. Noise and alignment of input data based on r(k) could also be included in this encoded output stream 64.

At some point, the encoded output stream 64 is fed to a decoder 66. The decoder 66 uses the same first and second encoding values to decode the encoded bit stream and provide a pair of decoded bit streams corresponding to the original input bit streams 61a and 61b. The decoder 61 thus receives the encoded serial bit stream 64 and selects the bits from the encoded bit stream, as determined by the first and second values, to produce decoded versions 68a, 68b of the input streams.

As described above, the encoder 32 inserts noise bits into the output bit stream to obfuscate the input bits. Such noise bits are considered to be useless data. The alternative encoder 66 (FIG. 2A) inserts and the decoder 66 removes useful data such as the second bit stream 61b, as mentioned. Alternatively, the encoder 62 can use the tail-end of the original input bit stream, as the second data bit stream. The second data bit stream may obfuscate the bits of the first input stream 61a and still constitute useful bits that can reduce the effective size of the output bit stream 64.

Figure 3:
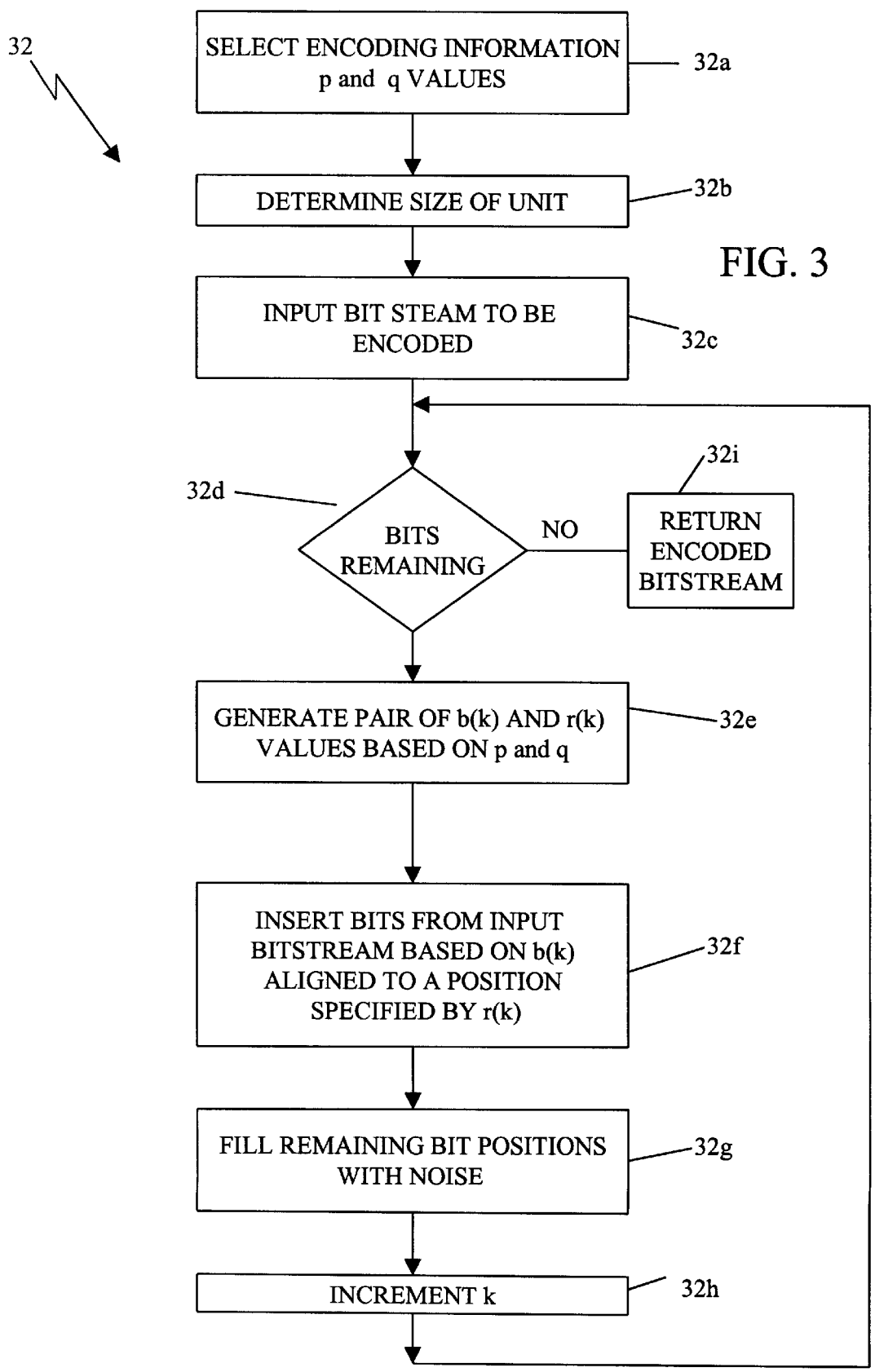
FIG. 3 is a flow chart of an encoder for the encoder/decoder system.

Referring now to FIG. 3, the encoder 32 is shown. The encoder 32 uses a deterministic non-trivial technique to generate the first value and the second value. The first value b(k) corresponds to the number of bits in the input bit stream that will be selected for insertion into a unit of the output bit stream. The second value r(k) corresponds to the alignment bit value that represents the rightmost bit position that the selected input bits are to be aligned to.

The scheme can also be used to generate first and second values for the encoder 62 and decoder 66 (FIG. 2A).

One preferred technique to produce b(k) and r(k) is based on the notion of primitive roots, as will be described below. Suffice it here to say that the encoder selects 32a a pair of prime numbers "p" and "q" with "p" being a primitive root of "q." The encoder 32 uses "p" and "q" to generate b(k) and r(k). The encoder 32 will place the values of "p" and "q" into a header that accompanies the encoded bit stream such that a decoder 36 can identify the two prime numbers "p" and "q" and produce from the p and k prime numbers the first value b(k) and second value r(k) during decoding. For added security, the header can be encrypted. Alternatively, the values of the two prime numbers to produce the b(k) and r(k) values can be in a software application that uses the encoder 32. Also the values of the two prime numbers to produce the b(k) and r(k) values can be user-supplied.

The encoding algorithm determines 32b the size of an encoded output unit. Typically, this size is a byte. Alternatively, the size of the encoded unit could be a word, a long word, or a quad word or other number of bits. The input bit stream to be encoded is fed 32c to and used by the encoder 32 along with the encoding information and the size of the unit. The encoder 32 checks 32d whether there are any remaining bits in the input bit stream that still need to be encoded. If there are bits remaining to be encoded, the encoder generates 32e a pair of values to encode the input bit stream.

Figure 3A:
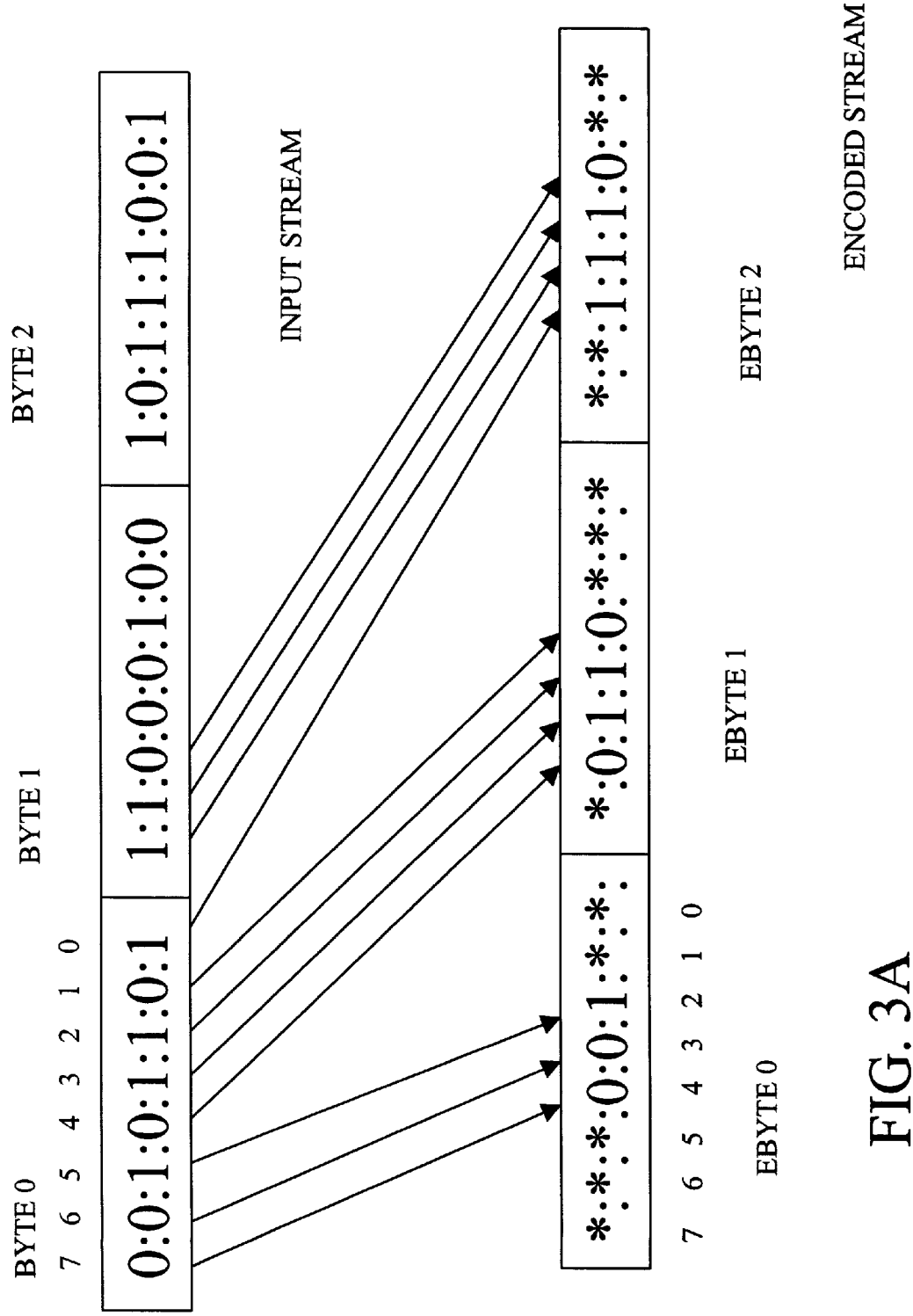
FIG. 3A is a diagram showing a relationship between an input bit stream and an encoded bit stream.

This can be illustrated, for example, by reference to FIG. 3A which shows an input stream comprising three bytes, BYTE 0–BYTE 2, and an encoded bit stream comprising two bytes, EBYTE 0–EBYTE 1 that contain the first seven bits of the first byte, BYTE 0 of the input bit stream. As shown in FIG. 3A, with b(0)=3 and r(0)=2, the encoded byte EBYTE 0 has bits 7–5 of the input bit stream "001" placed in bit positions 4 through 2 of the encoded byte EBYTE 0.

After inserting selected bits from the input bit stream based on the values of b(0) aligned to a bit position specified by r(0), the remaining bits in the encoded byte are filled 32g with random bits or noise bits that can be produced using well-known random noise techniques. This is illustrated in FIG. 3A by the "*" symbol occupying bits positions 0,1, and 5–7 of EBYTE 0. The value of "k" is incremented 32h and the process repeats to select additional bits for the next unit of the output bit stream.

Thus, as shown in FIG. 3A, for b(1)=4 and r(1)=3, EBYTE 1 of the encoded bit stream has bits 4–1 of the input bit stream "0110" placed in bit positions 6 through 3 of the encoded byte EBYTE 1.

After inserting selected bits from the input bit stream based on the value of b(1) aligned to a bit position specified by r(1), remaining bits in the encoded byte are again filled 32g with random bits or noise bits. This is also illustrated in FIG. 3A by the "*" occupying bits positions 0–2, and 7 of EBYTE 1. The value of "k" is incremented 32h and the process repeats to select additional bits for the next unit (not shown) of the output bit stream 38.

Thus, as shown in FIG. 3A, for b(2)=4 and r(2)=3, EBYTE 2 of the encoded bit stream has the bit from bit 0 of the input bit stream BYTE 0 placed in bit position 5 of the encoded byte EBYTE 2 and has bits 7–5 of the next input byte, BYTE 1 in bit positions 4–2 of the encoded byte EBYTE 2.

After inserting selected bits from the input bit stream based on the value of b(2) aligned to a bit position specified by r(2), remaining bits in the encoded byte are again filled 32g with random bits or noise bits. This is also illustrated by the "*" occupying bits positions 0, 1 and 6, 7 of EBYTE 2. The value of "k" is incremented 32h and the process repeats to select additional bits for the next unit (not shown) of the output bit stream.

This process continues until all of the remaining bits in the input bit stream have been placed in subsequent units of the encoded bit stream. At that point the encoder determines 32d that there are no more bits and will return 32i the encoded bit stream. However, toward the end of the input bit stream there may be fewer bits remaining in the input bit stream than could be selected based upon value of b(k). In this situation, only those number of bits from the input bit stream are selected and all the remaining positions in the output byte are filled with noise bits. When there are fewer bits available than is specified by b(k), bit values of "0" are preferable used for the bits that are not part of the input bit stream. This is preferred to preserve the freedom to apply various deterministic transformations to the encoded unit, as will be described below, and to permit the use on pipelining techniques (either software or hardware) for encoding and decoding. Therefore extra zeros are added at the end of the input data as needed.

Also, bits or units of the encoded bit stream can be returned, as they are completed, particularly if pipelining techniques are used to implement encoding.

Figure 4:
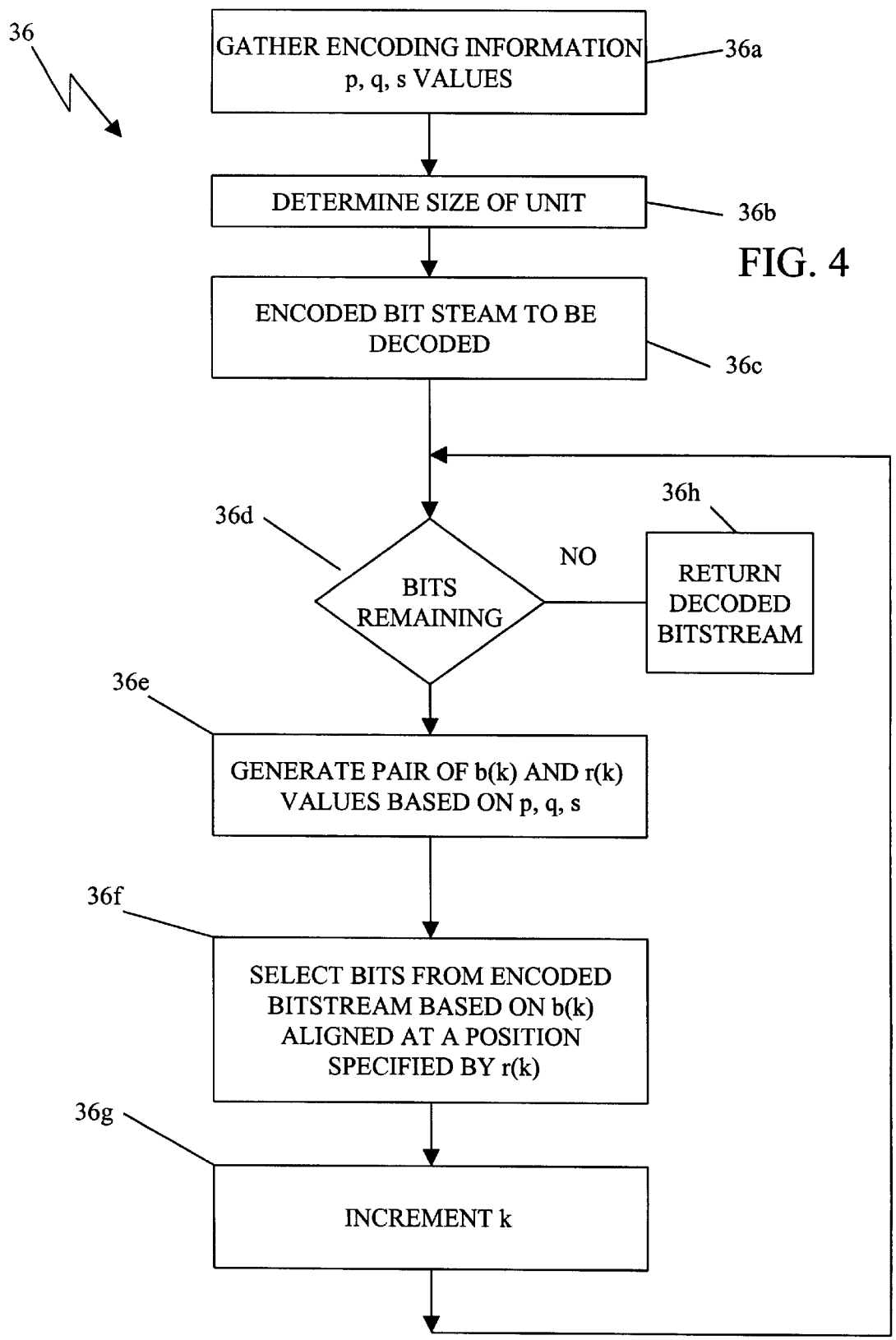
FIG. 4 is a flow chart of a decoder for the encoder/decoder system.

Referring now to FIG. 4, the decoder 36 gathers 36a encoded information corresponding to "p" and "q" values. The "p" and "q" values can be gathered from several different sources according to the scheme implemented, e.g., from a header, an encrypted header, or an application program as mentioned above. Also the values of "p" and "q" can be known a priori by the user and inserted into the decoder at an appropriate stage, for example, by prompting the user for the values.

Figure 4A:
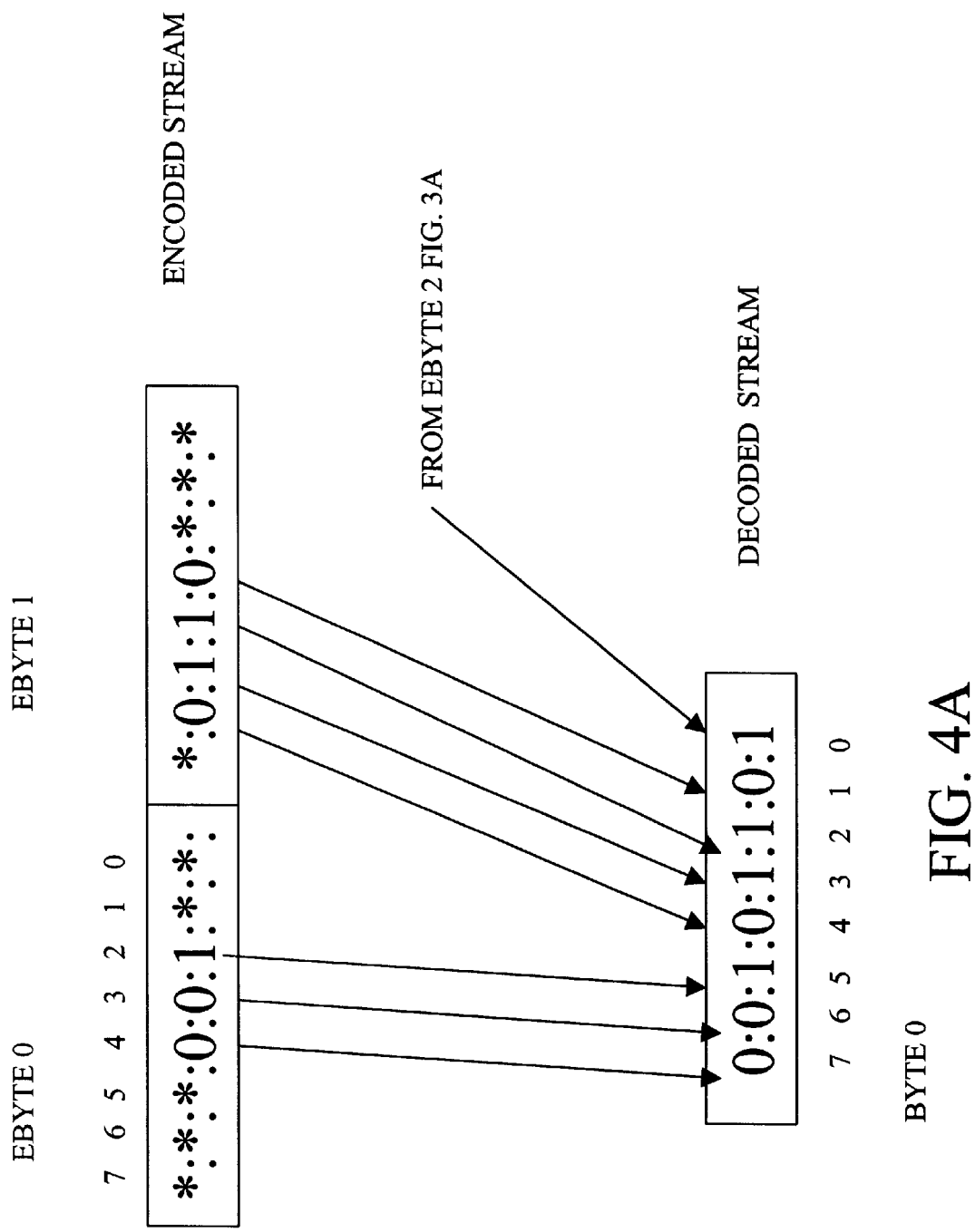
FIG. 4A is a diagram showing a relationship between part of the encoded bit stream of FIG. 3A and a decoded bit stream.

The decoder 36 determines 36b the size of the encoded unit which can be a byte, word, long word, quad word and so forth as described above. This is typically also embedded in the encoded bit stream such as in the header but alternatively can be fixed in the particular program that uses the decoder 32 or be user-supplied. The encoded bit stream is fed 36c to the decoder 36 and the decoder 36 tests 36d whether there are any remaining bits in the encoded bit stream. If there are remaining bits in the encoded bit stream, the decoder 36 generates 36e, a value b(k), corresponding to the number of bits and alignment bit value r(k) from the values of "p" and "q" gathered by the decoder 36. The decoder 36 selects 36f a number of bits from the encoded bit stream based on the value of b(k) at an aligned bit position specified by the value of r(k), as illustrated by FIG. 4A.

The selected bits are placed into sequential bit positions the decoded bit stream 38 (FIG. 2) and the value of "k" is incremented 36g and the decoder 36 tests 36d if there are remaining bits. This decoder 36 continues until all bits in the encoded bit stream have been decoded. When all bits in the decoded bit stream have been decoded, the decoder 36 returns 36h the decoded bit stream. Alternatively, the decoder 36 can return portions of the decoded bit stream as the encoded bit stream is decoded. Therefore, the units of the decoded, output bit stream are filled with original bits from the input bit stream. With this process it is possible for one or more bytes of the encoded bit stream to be filled with all noise bits or all bits of the input bit stream.

The encoding process needs to know where the end of the input bit stream is. This is accomplished by including the number of bits in the stream and testing if there are any bits remaining 32d. Similarly, the decoding process needs to know how many bits to decode.

Several placements of b(k) bits can be allowed within an output unit. One way that this is accomplished is by using v values to determine a partitioning of an output unit, and selecting r values to align the bit positions. For example, suppose the output units are 16 bits wide. The encoder 32 could be modified to first determine how many bits of the 16 possible will constitute the first partition of the output unit. Suppose it is 6. Then, a b(k) value is used to select a number in the range of 0–6. The r(k) value can be selected based on b(k). That leaves 10 bits for the next partitioning of the output unit. Suppose it is 9. Then a b(k) value is used to select a number in the range of 0–9. The r(k) value can be selected based on b(k), adjusted by the size of the first partition. That leaves 1 bit for the next partitioning. Because partitioning is at a minimum of 1 bit, it will be 1 bit. A b(k) value would be selected in the range of 0–1, and the r(k) value can be selected based on b(k), adjusted by the size of the sum of the two partitions encountered.

Another advantage of this encoding technique is that b(k) and r(k) values can be represented by separate pairs of p and q values. That is, a first pair of primitive roots, p, q can be used to generate b(k) values, and a second, different pair of p, q primitive roots can be used to generate r(k) values.

One approach for noise insertion in obfuscated encoding requires a deterministic, non-trivial algorithm to select appropriate values of b(k) and r(k) such that both encoding and decoding can be deterministically performed. An approach for computing values of b(k) and r(k) should have the values appear to be random so that decoding of the encoded output stream is difficult without the information used to generate b(k) and r(k). Non-deterministic algorithms may be used to generate values of b(k) and r(k) in certain applications where some loss can be tolerated.

One technique for deterministically generating b(k) and r(k) is based on the mathematical notion of a primitive root. Simply stated, a prime number "p" is considered to be a primitive root of a prime number "q," if certain requirements are satisfied. These requirements are that both the number "p" and the number "q" are prime numbers, and the value of the number "p" is less than the value of the number "q." Another condition is that for an integer "k" that takes on the values from 0 to q−2 inclusive, the set of integers produced by evaluating the mathematical function given by Equation 1, $$p^k \bmod q \qquad \text{(Equation 1)}$$

for all defined values of "k," produces a set of integers containing all of the integers from 1 to q−1.

If all these conditions are satisfied, then the prime number "p" is said to be a primitive root of the prime number "q." As used above, "mod" refers to modulo arithmetic. The expression "$p^k$ mod q" equates to the remainder that is left when $p^k$ is divided by an integer "q" for an integer number of times.

As an example of a primitive root consider p=2 and q=5. The expression $p^k$ mod q for k=0 to 3 is given in Table 1.

TABLE 1

| k | $p^k$ ($2^k$) | $p^k$ mod q ($2^k$ mod 5) |
|---|---|---|
| 0 | 1 | 1 |
| 1 | 2 | 2 |
| 2 | 4 | 4 |
| 3 | 8 | 3 |

The number 2 is thus considered to be a primitive root of 5 since both p=2 and q=5 are prime numbers, p<q and the expression, $p^k$ mod q, generates all numbers between p and q−1.

TABLE 2

| k | $p^k$ ($2^k$) | $p^k$ mod q ($2^k$ mod 5) |
|---|---|---|
| 4 | 16 | 1 |
| 5 | 32 | 2 |
| 6 | 64 | 4 |
| 7 | 128 | 3 |

As shown in Table 2, the sequence repeats for values of k>3.

This feature of primitive roots can be used to generate a series of generated values "v(k)" as given by Equation 2.

$$v(k)=p^k \bmod q \qquad \text{(Equation 2)}$$

The function "v(k)" generates values in the range of 1 to q−1 when operating on (p, q) combinations in which a primitive root relationship exists. This algorithm is circular, as illustrated by the example above, in that for values of k greater than q−2, the function v(k) produces results modulo in the range of 1 to q−1 inclusive. This occurs because v(k+c*(q−1))=v(k) for any non-negative integer c. Therefore, if $$s=v(i)=p^i \bmod q \qquad \text{(Equation 3)}$$

for some value of i where i is $0 \leq i \leq q-2$, then $$v(i+k)=(s*(p^k)) \bmod q \qquad \text{(Equation 4)}$$

Equations 3 and 4 show that this algorithm will produce a set of values of v as {v(i), v(i+1), v(i+2), . . . v(i+q−2)} (Equation 4) that are equivalent to the set {v(0), v(1), v(2), . . . v(q−2)} produced by (Equation 2). This property can be used to provide a further embodiment, as will be described in FIGS. 5 and 6.

Equation 4 can generate all of the values between 1 to q−1 inclusive. These values can be used, as a base to generate values of b(k) and r(k), by taking modulo the output unit size for each "v" value used to generate b(k) or r(k). The values for b(k) and r(k) for both the encoder 32 and decoder 36 can be determined in accordance with the Equations 5 and 6:

$$b(k)=v(2*k)=p^{2*k} \bmod q \bmod(n+1) \qquad \text{(Equation 5)}$$

$$r(k)=v(2*k+1)=p^{2*k+1} \bmod q \bmod(n+1-b) \qquad \text{(Equation 6)}$$

where n=number of bits in the encoded unit (typically 8) and b is the number of bits selected by b(k) for a particular r(k).

Other techniques can be used to provide b(k) and r(k) from the generated v values. In the generated sequence, b(k) and r(k) values each use one of the values generated by the generated sequence v(k). A sample listing of some primitive roots is contained as Appendix A attached hereto and incorporated by reference.

Figure 5:
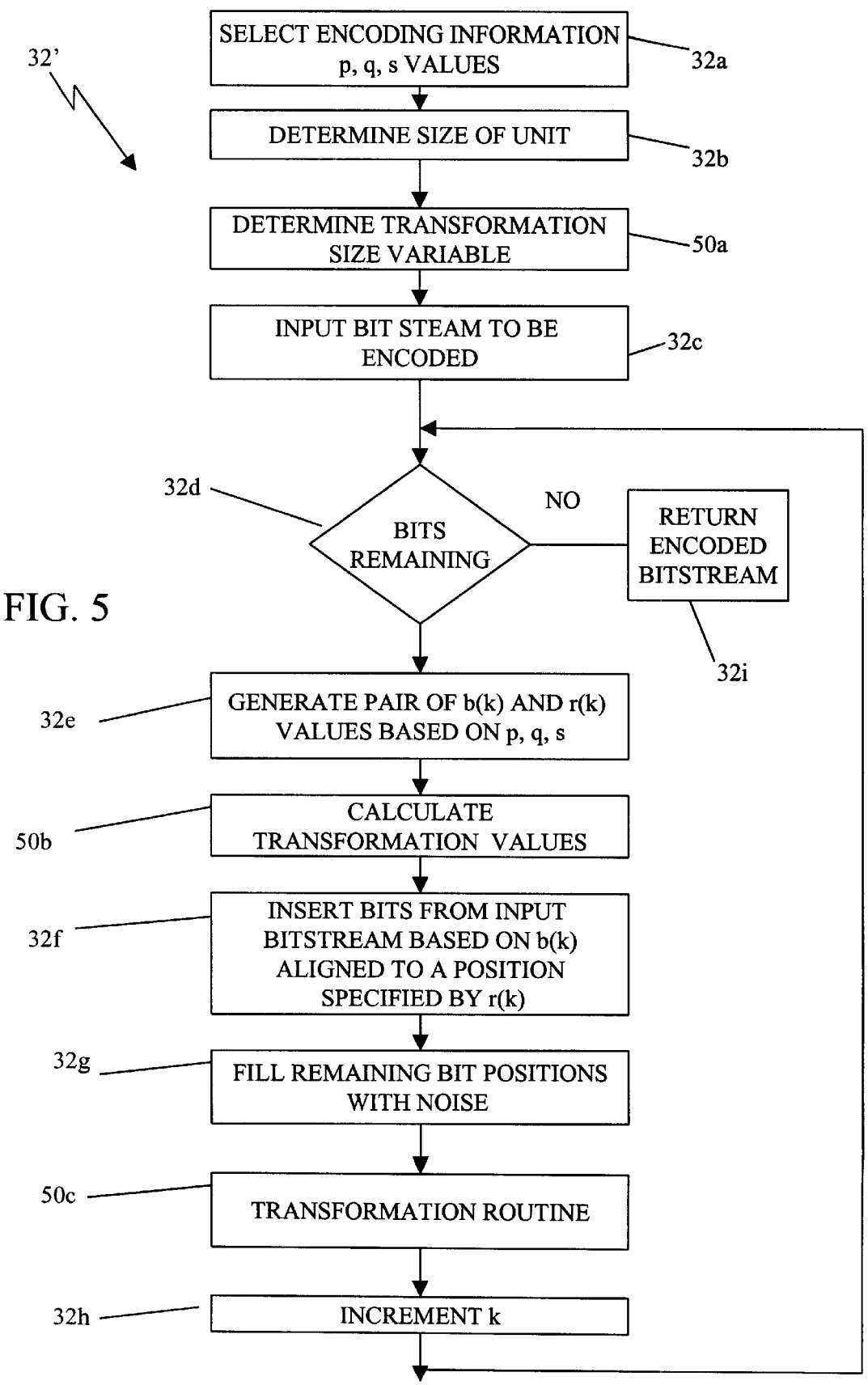
FIG. 5 is a block diagram of an alternate encoder.

Referring now to FIG. 5, an alternate embodiment 32' of an encoder that uses the circular property of primitive roots and includes a transformation routine is shown. The encoder 32' selects bits from an input bit stream. The bits are selected in accordance with a bit number value b(k). The bits are aligned to an output unit in accordance with a bit alignment value r(k). The values b(k) and r(k) are generated based upon values of "p" and "q," as described above in conjunction with FIG. 3.

As mentioned above, the primitive root process is circular in that for values of k greater than q−2, the function v(k) produces the same value modulo in the range of 1 to q−1 inclusive. Therefore, the encoder also generates p(k) and r(k) based on a value "s" that corresponds to a starting value of a sequence of values generated by the "p" and "q" values. The value "s" enables encoder 32' to use an arbitrary start position in the generated sequence, i.e., the function "v(k)," determined by "s." The encoder also uses one or more transformations determined by values "t" and "z" on the encoded bit stream.

The encoder 32' selects 32a encoding information values, i.e., values "p," "q," "s" and "z." The encoder determines 32b the size of the unit and determines 50a the transformation size variable "w." The transformation size variable "w" indicates how many generated values are required for further manipulation of the output bit stream data. This particular transformation size variable will be dependent upon the transformation routine applied to the encoded bits (described below). The input stream to be encoded is fed 32c to the encoder and the encoder checks 32d if there are any remaining bits to be encoded (as was generally performed for the encoder 32, FIG. 3.) If there are additional bits to be encoded, the encoder will generate pairs of values of b(k), r(k) and t(k), based on values of "p," "q", "s", "w" and "z."

As above, the values of b(k) and r(k), along with s(k) and t(k) are specified. The b and r values each require one number from the generated v values sequence. The t value may require 0 or more generated values from the v(k) sequence. If w represents count of numbers required by the t function, then the total count required for each k index for the b(k), r(k), and t(k) functions is 2+w. Therefore, the numbers generated by the v function can be assigned as follows:

$b(k)$ uses $v(i+(2+w)*k)$ $r(k)$ uses $v(i+(2+w)*k+1)$ t(k) uses either none or, if w>0, then uses:

$v(i+(2+w)*k+2), v(i+(2+w)*k+3), \ldots v(i+(2+w)*k+(w+2))$

If between 0 and n (where $1 \leq n \leq 8$) bits are to be taken from the source stream at a time for processing, then b(k) is a number in the range of 0 to n, inclusive. This can be accomplished by taking the v number for b(k) mod (n+1) as:

$b(k)=v(i+(2+w)*k) \bmod (n+1)$ (Equation 7)

The placement of these bits in the output stream is limited according to the number of bits placed. For example, consider an output unit of a byte. If 8 bits are selected a full byte, then the bits must occupy the full byte and, therefore, the right-most bit is at location 0. If 7 bits are selected, then the right-most most bit can be in locations 0 or 1. In general, if m bits are selected, then the right-most bit can be in positions between 0 and 9−m, inclusive. Numbers in this range can be generated by taking a value modulo 9−m. So, the bit position to place the source bits is determined by taking the second generated value from the v(k) function modulo 9 minus the number bits being placed or:

$r(k)=(v(i+(2+w)*k+1)) \bmod (9-n)$ (Equation 8)

If b(k) is 0, then the value of r(k) is not used and the computation can be skipped. The generated value v may either be skipped or reused for the next b value to be computed. No matter which is done, the same choice is made for encoding and decoding so that the process remains deterministic.

The encoder 32' may also generate 50b a transformation value. The transformation values are produced by selecting additional v values in sequence following the last computed r value. These values can be computed iteratively, as is shown in Table 3.

TABLE 3

1. Let i = 0, Let h = {last v value used in determining the last r value}
2. If i < w, return, otherwise continue
3. Let h = p*h mod q
4. Add h to set of t values
5. Let i = i + 1
6. Go to step 2.

The encoder 32' selects the next b number of bits or fewer if it is at the end of the input stream, and places the selected bits in an output unit byte so that the rightmost bit is at the bit position specified by r(k). The encoder 32' fills 32 g remaining bit positions with random or noise bits. The encoder 32' passes the output unit, e.g., byte to the transformation routine 50c and the transformation routine operates on the output byte to transform the output byte and return the transformed value to be placed in the output bit stream.

A transformation routine could, for instance, modify the current output unit e.g., a byte to perform some transformation on the byte using the t values that are active any initial state value such as p, q, s and z and return the transformed byte. After the input bit stream bits and random data have been placed into an output unit, this data may be transformed by a process "t." This process can use any of the p, q, s, b, r and v values mentioned above. In addition, additional values "z" may be used by the "t" process, and are provided by the encoding process to specify additional options (e.g., transformations, dual bit stream encoding, folding or tail-end encoding, etc.) and may be required by the decoding process.

One example of a transformation as mentioned above, inverts all the bits of the byte and returns the inverted bits in accordance with the computed values of t. This will provide an additional degree of security to the encoded bit stream.

Other examples of transformation processes include adjusting the output unit by a fixed or variable amount. On approach could add a fixed value to each output unit in the encoding process and remove the fixed value in the decoding process. Others are possible. For example, the output unit bit order can be reversed or the output unit can be adjusted by an amount that is determined by use of the next generated value "v."

The transformation "t" function can use or not use the "v" function values. In addition, the transformation "t" function may use any initial z values. As an example, assume that the transformation "t" function uses one v function value and relies on a z value as well. In this example, the transformation "t" function determines if the bits in a byte are to be inverted using Equation 9:

$$t(k)=(v(i+3*k+2) \bmod z) \bmod 2 \quad \text{(Equation 9)}$$

where if t(k) is 0, do nothing, and if t(k) is 1, invert the bits within the output byte.

There are simple iterative equivalents for the b(k), r(k), and t(k) computations based on:

Let $h(k) = s$
$h(k) = (p^{(2+w)} * h(k-1)) \bmod q$

Then,
$b(k) = (h(k) \bmod (n+1)$
$r(k) = ((p * h(k) \bmod q) \bmod (9 - b(k))$
$t(k) = $ unused or if $w > 0$, then
$\{p^2 * h(k)) \bmod q,$
$(p^3 * h(k)) \bmod q, \ldots,$
$(p^{(1+w)} * h(k)) \bmod q)$ That is, (assuming the t function uses one value as in the example):

Start with h=s and n=8;
The values b(0), r(0) and t(0) are:
b(0)=h mod 9
Let h=p*h mod q
r(0)=h mod(9−b(0))
Let h=p*h mod q
t(0)=(h mod z)mod 2
Let h=p*h mod q,
The values b(1), r(1) and t(1) are:
b(1)=h mod 9
Let h=p*h mod q
r(1)=h mod(9−b(1))
Let h=p*h mod q t(1)=(h mod z)mod 2
Let h=p*h mod q These values are determined in accordance with the following equations:

$b(k)=h \bmod(n+1)$
$h=p*h \bmod q$
$r(k)=h \bmod(9-b)$
$h=p*h \bmod q$ where h is initialized to "s," k is initialized to 0, and 9 corresponds to the output unit size plus 1. An example of a code sequence to produce values that can be used for b(k), r(k) and t(k) is shown in Appendix B along with two examples, one for s=1 and one for s=13 which demonstrates the cyclic, random-appearing nature of the encoder information.

Figure 5A:
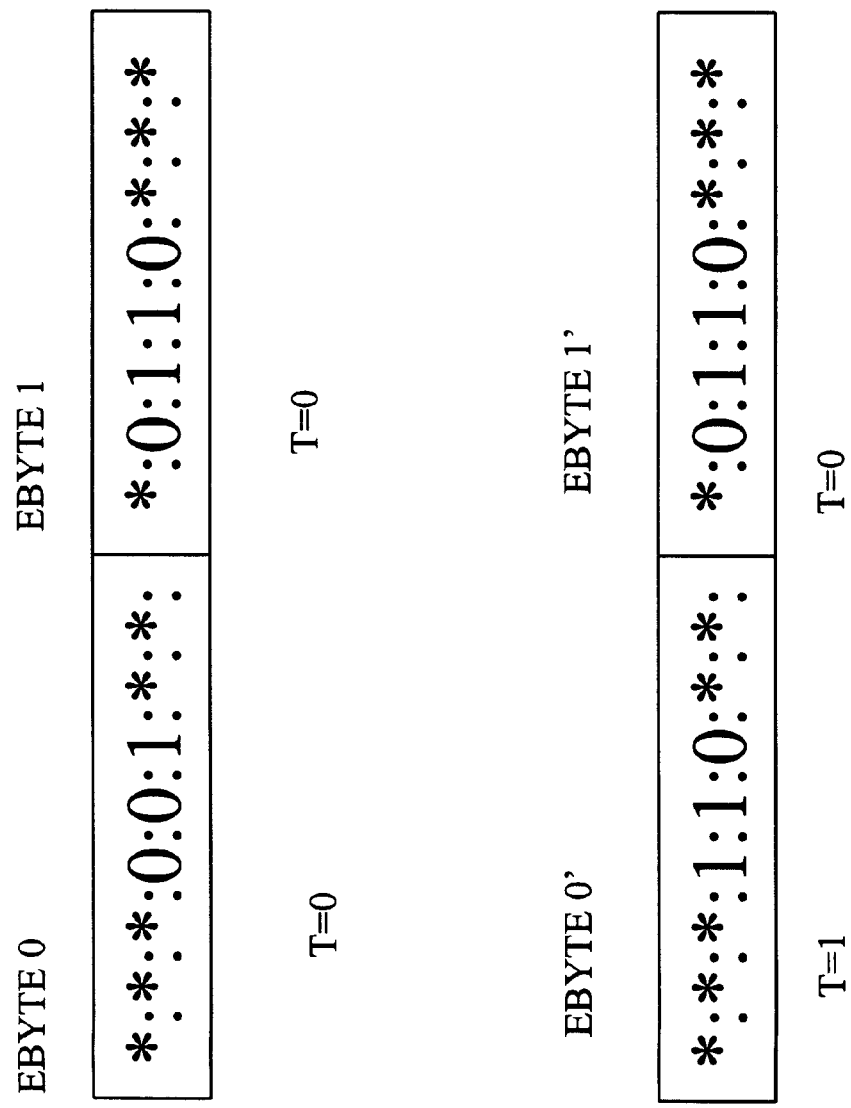
FIG. 5A is a diagram showing the effect of a transformation applied to an encoded data stream.

Referring now to FIG. 5A, an example of an inversion transformation routine is shown where encoded bytes EBYTE 0 and EBYTE 1 are shown for values of t=0 which would be characteristic of the process described in conjunction with FIG. 3A. Also shown are bytes EBYTE 0' and EBYTE 1' which result from applying the transformation process 50b to bytes EBYTE 0 and EBYTE1. With EBYTE 0' and EBYTE 1' having values of t=1 and t=0, respectively, it can be seen that byte EBYTE 0' has the input bits in bit positions 3–5 inverted from the bit values of the nontransformed byte EBYTE 0 whereas for t=0, EBYTE 1' is the same (i.e., not transformed) as EBYTE 1.

Referring now to FIG. 6, a decoder 36' that can decode an encoded, transformed bit stream is shown. The decoder gathers encoding information 36a, as described above, including values of p, q, s, t and z values that were determined in the encoding process for FIG. 5. The decoder 36' should know how to obtain these values, whether it is from a header, an application program, or so forth, as generally described above. The decoder 36' determines 36b the size of the output unit which will typically be a byte or 8 bits although other units, as mentioned above, could also be used. The decoder 36' determines 52a the transformation size variable depending upon the transformation routine employed by the decoder 36'. The encoded bit stream is fed 36c to the decoder 36' and the decoder 36' checks 36d whether there are any remaining bits to be decoded from the encoded bit stream. If there are remaining bits to be decoded, the decoder generates 36e a pair of values of b(k) and r(k) that are based on values of p, q and s. These values are determined in accordance with the following equations:

$b(k)=h \bmod(n+1)$
$h=p*h \bmod q$
$r(k)=h \bmod(9-b)$
$h=p*h \bmod q$

The decoder 36' will also calculate 52b transformation values by using the same process described in conjunction with Table 3 above. The decoder 36' will call 52c the transformation routine and apply the particular transformation to the encoded output unit. The encoder will select 36f bits from the transformed encoded bit stream based on values of b(k) which are aligned at a position specified by r(k). The decoder 36' will increment the value of k and will check 36d again to see if there are any remaining bits, and generate 36e subsequent pairs of b(k) and r(k) and calculate subsequent transformation values until all bits of the encoded bit stream have been decoded at which point it will return the decoded, fully transformed bit stream 36h.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired. In any case, the language can be a compiled or interpreted language. Suitable processors include, by way of example, both general and special-purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of encoding a serial bit stream of digital data, the method comprises:

placing a first portion of bits from the input bit stream into bit positions of an encoded output unit in accordance with a first value, said first number of bits aligned to a bit position in the encoded output unit in accordance with a second value and inserting bits of arbitrary value into remaining bit positions of the unit of the encoded output unit;

placing a remaining portion of bits from the input bit stream into bit positions of a second encoded output unit in accordance with a different, first value, said remaining portion of bits aligned to a bit position in the second encoded output unit in accordance with a different, second value and inserting bits of arbitrary value into remaining bit positions of the second unit of the encoded output unit; and wherein the bits of arbitrary value are noise bits.

2. A method of encoding a serial bit stream of digital data, the method comprises:

placing a first portion of bits from the input bit stream into bit positions of an encoded output unit in accordance with a first value, said first number of bits aligned to a bit position in the encoded output unit in accordance with a second value and inserting bits of arbitrary value into remaining bit positions of the unit of the encoded output unit;

placing a remaining portion of bits from the input bit stream into bit positions of a second encoded output unit in accordance with a different, first value, said remaining portion of bits aligned to a bit position in the second encoded output unit in accordance with a different, second value and inserting bits of arbitrary value into remaining bit positions of the second unit of the encoded output unit; and iteratively generating subsequent first values and subsequent second values for the actions of placing, and for each subsequent action of placing, placing a variable number of bits, as determined by the subsequent first values from the input bit stream into subsequent encoded output units.

3. The method of claim 2 wherein generating the first value and the second value uses a deterministic non-trivial algorithm to select the first value and second value.

4. The method of claim 3 wherein the deterministic non-trivial algorithm comprises determining pairs of generated values from a first prime number and a second prime number, where the first prime number is a primitive root of the second prime number.

5. The method of claim 4 wherein pairs of generated values based on the first and second prime numbers are used to determine the first and second values.

6. The method of claim 2 wherein the unit of encoded data is a byte, word, long word or quad word.

7. The method of claim 2 wherein the unit of data is a byte.

8. The method of claim 2 wherein placing further comprises modifying the selected input bits in the encoded bit stream in accordance with whether a third value corresponds to a logic 0 or a logic 1.

9. The method of claim 2 further comprising supplying the encoded bit stream with a header that identifies values of the two prime numbers to produce the generated values.

10. The method of claim 9 wherein the header is encrypted.

11. The method of claim 5 wherein the values of the two prime numbers to produce the generated values are in a software application that uses the encoding method.

12. The method of claim 5 wherein values of the two prime numbers to produce the generated values are user supplied.

13. The method of claim 2 wherein placing further comprises applying a transformation to the selected bits and noise.

14. The method of claim 2 wherein the first value is defined as b(k) and the second value is defined as r(k) and are given by:

$$b(k)=v(2*k)=p^{2*k} \bmod q \bmod(n+1)$$

$$r(k)=v(2*k+1)=p^{2*k+1} \bmod q \bmod(n+1-b).$$

15. The method of claim 2 wherein the first value is defined as b(k) and the second value is defined as r(k) and are given by:

$$b(k)=v(i+(2+w)*k)\bmod(n+1)$$

$$r(k)=(v(i+(2+w)*k+1)\bmod(9-b(k))$$

$$t(k)=(v(i+3*k+2)\bmod z)\bmod 2.$$

16. The method of claim 2 wherein placing bits into the encoded output unit further comprises inverting a unit of the encoded bit stream in accordance with whether a third value corresponds to a logic 0 or a logic 1.

17. A method of decoding an encoded serial bit stream, the method comprising:

selecting significant bits from a unit of the encoded bit stream in accordance with a number of bits value and a bit alignment value to place the selected bits in a decoded bit streams;

gathering values of two prime numbers to produce generated values;

generating the generated values based on the gathered values of the two prime numbers; and producing the number of bits value and the bit alignment value from the generated values.

18. The method of claim 17 further comprising iteratively repeating the generating, producing and selecting actions until all bits of the encoded bit stream have been placed in the decoded bit stream.

19. The method of claim 17 wherein the encoded unit is a byte, word, long word or quad word.

20. The method of claim 17 wherein the encoded unit is a byte.

21. The method of claim 20 wherein generating provides said generated values in accordance with a primitive root algorithm.

22. The method of claim 17 wherein selecting identifies the number of bits in the encoded bit stream and the bit position in the encoded bit stream.

23. The method of claim 20 further comprising:
gathering a third value and wherein said third value determines a filter function to apply to the selected bits.

24. The method of claim 23 wherein said third value determines whether or not the selected bits in the encoded bit stream unit are inverted to provided the decoded bit stream.

25. The method of claim 20 wherein gathering further comprises decrypting values to find the two prime numbers.

26. The method of claim 20 wherein gathering further comprises retrieving the values of the two prime numbers from an application program.

27. The method of claim 20 wherein gathering further comprises retrieving user supplied values of the two prime numbers.

28. The method of claim 20 wherein gathering further comprises retrieving the values of the two prime numbers from a header that accompanies the encoded bit stream.

29. A computer program product residing on a computer readable medium for encoding a serial bit stream of digital data, the product comprising instructions for causing a processor to:
place a first portion of bits from the input bit stream into bit positions of an encoded output unit in accordance with a first value, said first number of bits aligned to a bit position in the encoded output unit in accordance with a second value and insert bits of arbitrary value into remaining, bit positions of the unit of the encoded output unit; and
place a remaining portion of bits from the input bit stream into bit positions of a second encoded output unit in accordance with a different, first value, said remaining portion of bits aligned to a bit position in the second encoded output unit in accordance with a different, second value and insert bits of arbitrary value into remaining bit positions of the second unit of the encoded output unit; and
iteratively generate subsequent first values and subsequent second values to place a variable number of bits determined by the subsequent first values from the input bit stream into subsequent encoded output units.

30. The computer program product of claim 29 wherein instructions that cause the processor to generate the first value and the second value use a deterministic non-trivial algorithm to select the first value and second value.

31. The computer program product of claim 30 wherein the deterministic non-trivial algorithm comprises instructions that cause the processor to
determine pairs of generated values from a first prime number and a second prime number, where the first prime number is a primitive root of the second prime number.

32. The computer program product of claim 31 wherein pairs of generated values based on the first and second prime numbers are used to determine the first and second values.

33. The computer program product of claim 29 wherein the unit of encoded data is a byte, word, long word or quad word.

34. The computer program product of claim 29 wherein the unit of data is a byte.

35. The computer program product of claim 29 wherein instructions that cause the processor to place further comprise instructions that cause the processor to modify the selected input bits in the encoded bit stream in accordance with whether a third value corresponds to a logic 0 or a logic 1.

36. The computer program product of claim 31 further comprising a header that identifies values of the two prime numbers to produce the generated values.

37. The computer program product of claim 36 wherein the header is encrypted.

38. The computer program product of claim 31 wherein the values of the two prime numbers to produce the generated values are in a software application that uses the encoding computer program product.

39. The computer program product of claim 31 wherein values of the two prime numbers to produce the generated values are user supplied.

40. The computer program product of claim 29 wherein instructions that cause the processor to place bits further comprise instructions that cause the processor to apply a transformation to the selected bits and noise.

41. The computer program product of claim 29 wherein the first value is defined as b(k) and the second value is defined as r(k) and are given by:

$$b(k)=v(2*k)=p^{2*k} \bmod q \bmod(n+1)$$

$$r(k)=v(2*k+1)=p^{2*k+1} \bmod q \bmod(n+1-b).$$

42. The computer program product of claim 29 wherein the first value is defined as b(k) and the second value is defined as r(k) and are given by:

$$b(k)=v(i+(2+w)*k)\bmod(n+1)$$

$$r(k)=(v(i+(2+w)*k+1)\bmod(9-b(k))$$

$$t(k)=(v(i+3*k+2)\bmod z)\bmod 2.$$

43. A computer program product residing on a computer readable medium for decoding an encoded serial bit stream, the computer program product comprising instructions that cause a processor to:
select significant bits from a unit of the encoded bit stream in accordance with a number of bits value and a bit alignment value to place the selected bits in a decoded bit stream;
gather values of two prime numbers to produce generated values;
generate the generated values based on the gathered values of the two prime numbers; and
produce the number of bits value and the bit alignment value from the generated values.

44. The computer program product of claim 43 further comprising instructions that cause a processor to:
iteratively repeat the generate, produce and select instructions until all bits of the encoded bit stream have been placed in the decoded bit stream.

45. The computer program product of claim 43 wherein the encoded unit is a byte, word, long word or quad word.

46. The computer program product of claim 43 wherein the encoded unit is a byte.

47. The computer program product of claim 43 wherein instructions that cause a processor to generate generated values provides said generated values in accordance with a primitive root algorithm.

48. The computer program product of claim 47 wherein instructions that cause a processor to select significant bits further comprises instructions that cause the processor to identify the number of bits in the encoded bit stream and the bit position in the encoded bit stream.

49. The computer program product of claim 43 further comprising instructions that cause a processor to gather a third value and wherein said third value determines a filter function to apply to the selected bits.

50. The computer program product of claim 49 wherein said third value determines whether or not the selected bits in the encoded bit stream unit are inverted to provided the decoded bit stream.

51. The computer program product of claim 43 wherein instructions that cause a processor to gather further comprises instructions that cause a processor to de-encrypt values to find the two prime numbers.

52. The computer program product of claim 43 wherein instructions that cause a processor to gather further comprises instructions that cause a processor to retrieve the values of the two prime numbers from an application program.

53. The computer program product of claim 43 wherein instructions that cause a processor to gather further comprises instructions that cause a processor to retrieve user supplied values of the two prime numbers.

54. The computer program product of claim 43 wherein instructions that cause a processor to gather further comprise instructions that cause a processor to retrieve the values of the two prime numbers from a header that accompanies the encoded bit stream.

* * * * *

UNITED STATES PATENT AND TRADEMARK OFFICE
CERTIFICATE OF CORRECTION

PATENT NO. : 6,275,587 B1  
DATED : August 14, 2001  
INVENTOR(S) : Stephen Kelley Amerige It is certified that error appears in the above-identified patent and that said Letters Patent is hereby corrected as shown below:

Column 14,
Line 57, replace "streams" with -- stream --;

Column 15,
Lines 5, 11, 17, 19, 22 and 25, replace "20" with -- 17 --;
Line 16, replace "provided" with -- provide --;

Column 17,
Line 12, replace "provided" with -- provide --.

Signed and Sealed this

Twenty-fifth Day of May, 2004

JON W. DUDAS
*Acting Director of the United States Patent and Trademark Office*